US005884051A

United States Patent [19]
Schaffer et al.

[11] Patent Number: 5,884,051
[45] Date of Patent: Mar. 16, 1999

[54] SYSTEM, METHODS AND COMPUTER PROGRAM PRODUCTS FOR FLEXIBLY CONTROLLING BUS ACCESS BASED ON FIXED AND DYNAMIC PRIORITIES

[75] Inventors: Mark Michael Schaffer, Cary; James N. Dieffenderfer, Apex; Edward Hammond Green, III; Juan Guillermo Revilla, both of Cary, all of N.C.

[73] Assignee: International Business Machines Corporation, Armonk, N.Y.

[21] Appl. No.: 874,639

[22] Filed: Jun. 13, 1997

[51] Int. Cl.[6] .......................... G06F 13/18; G06F 13/362
[52] U.S. Cl. ........................ 395/287; 395/296; 395/861
[58] Field of Search .................... 395/287, 296, 395/732, 728, 729, 861, 291, 673; 711/151, 158

[56] References Cited

U.S. PATENT DOCUMENTS

| 4,787,032 | 11/1988 | Culley | 364/200 |
|---|---|---|---|
| 5,203,007 | 4/1993 | Gallagher | 395/861 |
| 5,299,196 | 3/1994 | Allen, Jr. | 370/85.1 |
| 5,311,461 | 5/1994 | Gallagher | 395/673 |
| 5,371,736 | 12/1994 | Evan | 370/83 |
| 5,388,228 | 2/1995 | Heath et al. | 395/325 |
| 5,414,818 | 5/1995 | Henson et al. | 395/306 |
| 5,465,343 | 11/1995 | Henson et al. | 395/439 |
| 5,481,680 | 1/1996 | Larson et al. | 395/292 |
| 5,495,615 | 2/1996 | Nizar et al. | 395/733 |
| 5,506,972 | 4/1996 | Heath et al. | 395/293 |
| 5,528,767 | 6/1996 | Chen | 395/293 |
| 5,537,607 | 7/1996 | Ploger, III | 395/830 |
| 5,623,672 | 4/1997 | Popat | 395/728 |
| 5,715,406 | 2/1998 | Henson et al. | 395/287 |
| 5,754,800 | 5/1998 | Lentz et al. | 395/296 |

OTHER PUBLICATIONS

IBM Technical Disclosure Bulletin, vol. 32, No. 5A, Oct. 1989 Two–Level Internal Bus Arbitration for the System IO Bus.
IBM Technical Disclosure Bulletin, vol. 33, No. 2, Jul. 1990 One–Bit Token Ring Arbitration Protcol/Scheme.
IBM Technical Disclosure Bulletin, vol. 38, No. 2, Feb. 1995 Priority Scheme for Arithemtic Logic Unit and Dataflow Usage by P1394 Isochronous Hardware.
IBM Technical Disclosure Bulletin, vol. 38, No. 9, Sep. 1995 Method for Maintaining Coherency When Entering and Exiting Low–Power Mode in a Memory Controller Supporting Transaction Posting.

*Primary Examiner*—Gopal C. Ray
*Attorney, Agent, or Firm*—Myers, Bigel, Sibley & Sajovec

[57] ABSTRACT

Bus performance in a computer system having multiple devices accessing a common shared bus may be improved by providing a flexible bus arbiter. Bus access is controlled using a bus arbiter which is operationally connected to each of the devices. Each device has a fixed programmable priority level and a dynamic priority level associated with it. The dynamic priority level comprises an arbiter dynamic priority level and a master dynamic priority level. Access to the bus by a device is controlled based on the combination of the programmable fixed priority level and the dynamic priority level associated with each device. While the programmable fixed priority level and the arbiter dynamic priority level as set by the arbiter are not controlled by the master, the master dynamic priority level is controlled by the master. If master dynamic priority is enabled, it overrides the arbiter dynamic priority level. If master dynamic priority is not enabled but arbiter dynamic priority is enabled, master dynamic priority overrides the programmable fixed priority level.

21 Claims, 12 Drawing Sheets

FIG. 6B

| CYCLE | 1 | 2 | 3 | 4 | 5 | 6 | 7 | 8 | 9 | 10 | 11 | 12 |
|---|---|---|---|---|---|---|---|---|---|---|---|---|
| CLOCK | | | | | | | | | | | | |
| M0 REQUEST | 1 | 1 | 1 | 1 | | | | | | | | |
| M0 PRIORITY | 10 | 10 | 10 | 10 | | | | | | | | |
| M0 GRANT | 1 | 1 | 1 | 1 | | | | | | | | |
| M1 REQUEST | 1 | 1 | 1 | 1 | 1 | 1 | 1 | 1 | | | | |
| M1 PRIORITY | 11 | 11 | 11 | 11 | 11 | 11 | 11 | 11 | | | | |
| M1 GRANT | | | | | | | | | | | | |
| M2 REQUEST | | | | | 1 | 1 | 1 | 1 | 1 | 1 | 1 | |
| M2 PRIORITY | | | | | 10 | 10 | 10 | 10 | 10 | | | |
| M2 GRANT | | | | | | | | | 1 | 1 | 1 | |
| M3 REQUEST | | | | 1 | 1 | 1 | 1 | 1 | 1 | 1 | 1 | 1 |
| M3 PRIORITY | | | | 00 | 00 | 00 | 00 | 00 | 00 | 00 | 00 | 00 |
| M3 GRANT | | | | | | | | | | | | 1 |
| ARBITER CONTROL REG | 11 | 11 | 10 | 10 | 00 | 01 | 00 | 00 | 00 | 00 | 00 | 00 |
| MASTER ID REG[0:1] | 00 | 00 | 00 | 00 | 01 | 01 | 01 | 01 | 10 | 10 | 11 | 11 |
| MASTER ID REG[2:3] | 01 | 01 | 01 | 01 | 10 | 10 | 10 | 10 | 11 | 11 | 00 | 00 |
| MASTER ID REG[4:5] | 10 | 10 | 10 | 10 | 11 | 11 | 11 | 11 | 00 | 00 | 01 | 01 |
| MASTER ID REG[6:7] | 11 | 11 | 11 | 11 | 00 | 00 | 00 | 00 | 01 | 01 | 10 | 10 |
| MASTER PRIORITY REG[0:1] | 10 | 10 | 10 | 10 | 11 | 11 | 11 | 11 | 10 | 10 | 10 | 10 |
| MASTER PRIORITY REG[2:3] | 01 | 01 | 01 | 01 | 10 | 10 | 10 | 10 | 01 | 01 | 01 | 01 |
| MASTER PRIORITY REG[4:5] | 01 | 01 | 01 | 01 | 11 | 11 | 11 | 11 | 11 | 11 | 00 | 00 |
| MASTER PRIORITY REG[6:7] | 00 | 00 | 00 | 00 | 01 | 01 | 01 | 01 | 10 | 10 | 11 | 11 |

FIG. 9

SYSTEM, METHODS AND COMPUTER PROGRAM PRODUCTS FOR FLEXIBLY CONTROLLING BUS ACCESS BASED ON FIXED AND DYNAMIC PRIORITIES

FIELD OF THE INVENTION

The present invention relates to system bus performance, and more particularly, to controlling bus access to improve throughput and decrease latency by having flexible arbitration notwithstanding changes in applications.

BACKGROUND OF THE INVENTION

The number of functions on a single integrated circuit chip continues to increase in concert with an increase in chip densities. These "system-on-a-chip" integrated circuits typically use a common, shared bus architecture to provide the communication link between the various devices and subsystems of the "computer system." A common bus provides a low cost communication link since it can be shared between multiple devices in the computer system. However, the linking of multiple devices to a single bus may raise concerns over maximum bus performance.

Achieving maximum bus performance may be difficult in a shared bus architecture. Factors which severely impact bus performance may include system throughput (i.e., bandwidth) and system response time (i.e., latency). For purposes of determining throughput or bandwidth, a bus transaction is a bus transaction completed by the device which is on the receiving end of the transmission. Throughput or bandwidth is the average number of bus transactions over a period of time. Response time or latency is the time it takes to complete a bus transaction for a particular device beginning with the cycle during which the device first requests the bus until the cycle that the last piece of data is transferred from the device across the bus to a second device. A device which requests access to or control of a bus and transmits and receives data across a bus may be referred to as a "master." A device which transmits or receives data across a bus and is responsive to a master may be referred to as a "slave." A slave may not request access to or control of a bus.

In order to achieve a high degree of bus performance, the throughput generally must be high while the latency generally must be low. Further, in order to achieve a high level of bus throughput, the slave preferably is never idle and, consequently, the bus is preferably never idle. In contrast, however, since latency refers to the time it takes to complete a bus transaction beginning with the cycle during which a master first requests the bus until the cycle during which the last data is transferred by the master across the bus, latency includes the time during which a master waits for the bus to become available (i.e., idle). As a result, latency may be reduced by allowing the bus to be idle.

In order for masters to share a common bus and have access to the slaves which are operationally attached to the bus, a bus arbiter may be used to arbitrate which master takes control of the bus at a particular time. Typically, each master which is operationally connectable to the bus has a request signal output which is used to indicate to the arbiter that the master is requesting bus access. The bus arbiter has a corresponding bus grant output which may be used to indicate to the master that the arbiter has granted the bus to the master. Once a master's request has been granted, the master may take control of the bus. Generally, the arbiter considers all pending requests, and if the bus is idle, makes a determination as to which master should receive access to the bus. During the time that a particular master has access to, or control of, the bus, the arbiter may prevent other masters from accessing the bus by not granting their requests for control of the bus until the first master has completed its transfer of data across the bus and relinquished control of the bus.

A number of different methods have been developed in an effort to address bus performance, including throughput and response time. Many of these methods are directed to the design of the bus arbiter and the manner in which the bus arbiter determines the "priority" level of the device seeking control of the bus. Various bus arbitration designs exist determining which master should be granted access, or control of, the bus.

For example, one design is directed to a "fixed" priority. In a "fixed" priority design, each request is assigned a priority level. The bus arbiter grants access to, or control of, the bus to the master having an active request and the highest priority among those masters submitting a request to control the bus.

By way of specific example, U.S. Pat. No. 5,528,767 to Chen describes a programmable multi-level bus arbitration apparatus for use in a data processing system. The arbitration apparatus of Chen provides a preemptive, interrupt driven method which permits specified masters to interrupt the control of the bus by a first master even though the first master has not completed its operation. Each master has a priority associated with it such that control of the bus is granted to a particular master device based on a pre-programmed priority scheme. In addition to the priority assigned to each master, an additional preemption priority permits certain masters to preempt the ongoing operations of a first master in order to take control of a bus away from the first master prior to the first master having completed its operations.

By way of further example, U.S. Pat. No. 5,481,680 to Larson et al. describes a programmable bus arbitrator which provides for historical feedback, and error detection and correction. The prioritization method employed by Larson et al. is that of a "fixed" priority which takes into account the history of the bus requests, as well as error detection and correction.

Various other methods exist for arbitrating requests by masters to control the bus. However, bus arbitration methods are generally designed to meet the requirements specific to the particular application to be implemented as well as the requirements of the bandwidth for each master that is operationally connectable to the bus.

The bus usage conditions in a system may vary over time, for example, light usage to heavy usage back to light usage. In addition, bus usage conditions may also vary as a result of the "system-on-a-chip" integrated circuit being employed in various applications. Consequently, it may be necessary to change the priority scheme for the arbitration unit, as well as the arbitration unit design itself, dependent upon the application. Moreover, it may be desirable to have a single bus arbiter to implement the arbitration for several different "system-on-a-chip" integrated circuits.

Although various arbitration schemes are presently used to control access to a common bus in multiple devices, these prior designs may not effectively address the need for improving maximum bus performance while accounting for changing applications in which a "system-on-a-chip" integrated circuit is employed and multiple systems being developed around a common bus. In order to improve maximum bus performance, the bus arbiter must be flexible in order to account for changing applications which are implemented using a "system-on-a-chip" integrated circuit, and multiple chips being developed to communicate via a common bus interface.

SUMMARY OF THE INVENTION

It is, therefore, an object of the present invention to provide systems, methods and computer program products for improving bus performance in a computer system in which multiple devices share a common bus.

It is another object of the present invention to provide systems, methods and computer program products for improving bus performance which the computer system is employed in various applications.

These and other objects are provided according to the present invention by a system which provides flexible control over bus access. The system according to the present invention flexibly controls the access of multiple devices to a common bus through flexible bus arbitration. In a preferred embodiment, a bus arbiter is operationally connected to each of the devices. Each device has a fixed programmable priority level associated with it. In addition, each device also has associated with it a dynamic priority level. The dynamic priority level associated with the first device comprises an arbiter dynamic priority level and a master dynamic priority level. The programmable fixed priority level and the arbiter dynamic priority level are controlled by the arbiter, and not the masters. In contrast, the master dynamic priority level is controlled by the master.

Access to the bus by a device is controlled based on the combination of the programmable fixed priority level associated with the device and the dynamic priority level associated with the device such that access to the bus is granted to the device based on the combination of the programmable fixed priority level associated with the device and the dynamic priority level associated with the device.

The master dynamic priority level associated with the first device is received from the first device. Thereafter, the request to access the bus received from the first device is arbitrated based on the programmable fixed priority level and the arbiter dynamic priority level, which are both controlled by the arbiter. In addition, the request from the first device is also arbitrated based on the master dynamic priority level received from the first device. Access to the bus is granted to the first device in response to the arbitration based on the programmable fixed priority level, arbiter dynamic priority level and the master dynamic priority level. If the master dynamic priority level is enabled, it will override the programmable fixed priority level and the arbiter dynamic priority level. If the master dynamic priority level is not enabled and the arbiter dynamic priority level is enabled, the arbiter dynamic priority level will override the programmable fixed priority level. Finally, if both the master dynamic priority level and the arbiter dynamic priority level are not enabled, access to the bus will be granted based on the programmable fixed priority level.

The programmable fixed priority level may be changed to change the relative priority of the request from each master. In addition, if arbiter dynamic priority is enabled and a request to access the bus is granted to a particular device, the priority order based on the arbiter dynamic priority level is updated. The scheme for updating the priority order based on the arbiter dynamic priority level may be a "fair" arbitration scheme.

BRIEF DESCRIPTION OF THE DRAWINGS

FIG. 6B is a logic diagram illustrating the logic implemented by the priority encoder illustrated in FIGS. 2 and 6A according to the present invention;

FIG. 9 is a timing diagram illustrating exemplary operations of the flexible arbitration system according to the present invention.

DESCRIPTION OF THE PREFERRED EMBODIMENT

The present invention now will be described more fully hereinafter with reference to the accompanying drawings, in which a preferred embodiment of the invention is shown. This invention may, however, be embodied in many different forms and should not be construed as limited to the embodiment set forth herein; rather, this embodiment is provided so that this disclosure will be thorough and complete, and will fully convey the scope of the invention to those skilled in the art. Like numbers refer to like elements throughout.

As will be appreciated by one of skill in the art, the present invention may be embodied as a method, a system, or a computer program product. Accordingly, the present invention may take the form of an entirely hardware embodiment, an entirely software embodiment, or an embodiment combining software and hardware aspects.

Figure 1:
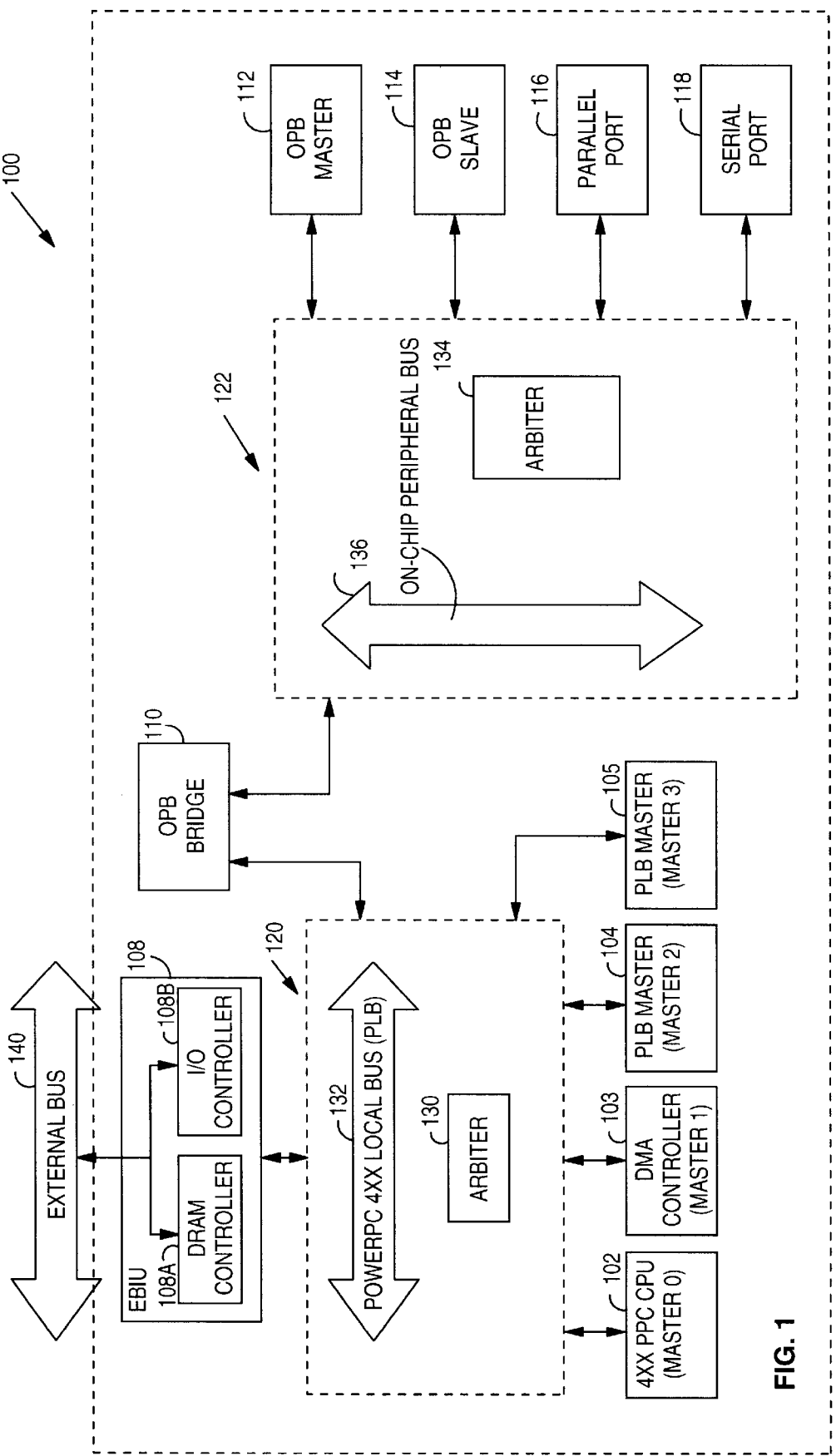
FIG. 1 is a block diagram illustrating the computer system according to the present invention.

Referring to FIG. 1, a block diagram illustrating a computer system according to the present invention is shown. In the example of the computer system illustrated generally at 100, computer system 100 is preferably a single integrated circuit chip. Computer system 100 has a number of devices and a bus. In particular, computer system 100 has several master devices including a 4XX PowerPC ("PPC") central processing unit ("CPU") 102, a direct memory access ("DMA") controller 103, and PowerPC local bus ("PLB") masters 104 and 105. In addition, computer system 100 also has an external bus interface unit ("EBIU") 108, which includes a dynamic random access memory ("DRAM") controller 108a and an input/output ("I/O") controller 108b. Still further, computer system 100 also has an on-chip peripheral bus ("OPB") bridge 110, an OPB master 112, an OPB slave 114, a parallel port 116 and a serial port 118.

Finally, computer system 100 also has two bus controllers, a bus controller referred to generally at 120 and a bus controller referred to generally at 122. Bus controller 120 includes arbiter 130 and PowerPC 4XX Local Bus 132. Bus controller 122 includes arbiter 134 and on-chip peripheral bus 136.

4XX PPC CPU 102, DMA controller 103, and PLB masters 104 and 105 are examples of "master" devices, and may be referred to as "Master 0," "Master 1," "Master 2," and "Master 3," respectively. EBIU 108 and OPB bridge 110 are examples of "slave" devices.

According to the present invention, Master 0 102, Master 1 103, Master 2 104 and Master 3 105 are each operationally connectable to bus controller 120, and consequently, arbiter 130. In addition, slave 108 and slave 110 are also operationally connectable to bus controller 120. In the computer system illustrated generally at 100, slave 110 (i.e., OPB bridge) acts as a slave device and operationally connects one of Master 0 102, Master 1 103, Master 2 104, and Master 3 105 to bus controller 122 and consequently, to arbiter 134.

As illustrated in FIG. 1, the present invention may facilitate the interconnection of a plurality of master devices or functions to a commonly shared bus. Similarly, the present invention may also enable the interconnection of a plurality of slave devices to a commonly shared bus. Preferably, the master functions and the slave functions are contained within a single integrated chip. However, it will be understood, as illustrated in FIG. 1, that the present invention may be used to connect devices located on a single chip such as computer system 100 to devices located on another chip via external bus 140. Thus, the present invention also applies to the arbitration of requests by multiple integrated circuits to access a single bus.

Overview: Flexible Arbitration System

The flexible arbitration system according to the present invention provides a single bus arbitration unit that provides both programmable fixed priority and dynamic priority which minimizes the delay experienced by masters when submitting requests to access a bus. The system according to the present invention implements programmable fixed priority by using a register in the arbiter to determine the fixed priority level for each master that is operationally connectable to the bus. The contents of the register may be programmably changed at any time to reflect the relative fixed priority of the requests from the masters. As a result, the relative fixed priority stored in the register in the arbiter may be programmably changed in order to reflect a fixed priority for a second application or system which may be different from the fixed priority for a first application or system.

The present invention implements two dynamic priorities, namely, an arbiter dynamic priority and a master dynamic priority. The arbiter dynamic priority is implemented using a register in the arbiter to control the relative dynamic priority of each request. After a request from a master is granted, and the master is granted access to, or control of, the bus, the present invention updates the arbiter dynamic priority (i.e., the relative priority between the masters) before the remaining requests are arbitrated. Any number of updating methodologies may be used. In the preferred embodiment, a "fair" arbitration methodology is used.

Finally, the present invention also implements master dynamic priority. The difference between the master dynamic priority versus the programmable fixed priority and the arbiter dynamic priority is that the programmable fixed priority and the arbiter dynamic priority are controlled by the arbiter itself. The masters have no control over the programmable fixed priority or the arbiter dynamic priority whereas the master dynamic priority is controlled, at least in part, by the masters.

Both the arbiter dynamic priority and the master dynamic priority may be enabled or disabled. If the master dynamic priority is enabled, it will override the arbiter dynamic priority and programmable fixed priority. If the master dynamic priority is not enabled but the arbiter dynamic priority is enabled, the arbiter dynamic priority will override the programmable fixed priority. Finally, if neither dynamic priority is enabled, the programmable fixed priority will control. If the master dynamic priority is disabled, all master requests are considered to be of equal priority by the arbiter. The master dynamic priority may be disabled if an application requires a true arbiter dynamic priority or a true programmed fixed priority.

A request signal is asserted by a master to request a data transfer across the bus. Each master has, in addition to a request signal, a two bit dynamic priority indicator. When the request signal is asserted, the master's priority signal must also be valid. The request priority signals are used to indicate the dynamic priority of the requests from the master. These signals must be valid any time the corresponding master request signal is asserted. The request signal may be represented as "M(x)_request." The request priority signals may be represented, for example, by "M(x)_priority (0:1)."

In the preferred embodiment, the master dynamic priority (i.e., request priority signals) may be one of four levels represented by a two bit request priority signal. The request priority levels are, in order from highest priority to lowest priority, as follows: "11" representing a priority level of "high," "10" representing a priority level of "medium high," "01" representing a priority level of "medium low," and "00" representing a priority level of "low." It will be understood by those having skill in the art that a variety of different priority representations may be used.

Finally, if the arbiter decides to grant a master's request for access to the bus, a grant signal, which may be represented by "M(x)_grant," is issued by the bus arbiter to indicate to the corresponding master that the bus has been granted to the master. As a result of the issuing of the grant signal, the master may then take control of the bus during the following cycle.

Detailed Design: Flexible Arbitration System

Figure 2:
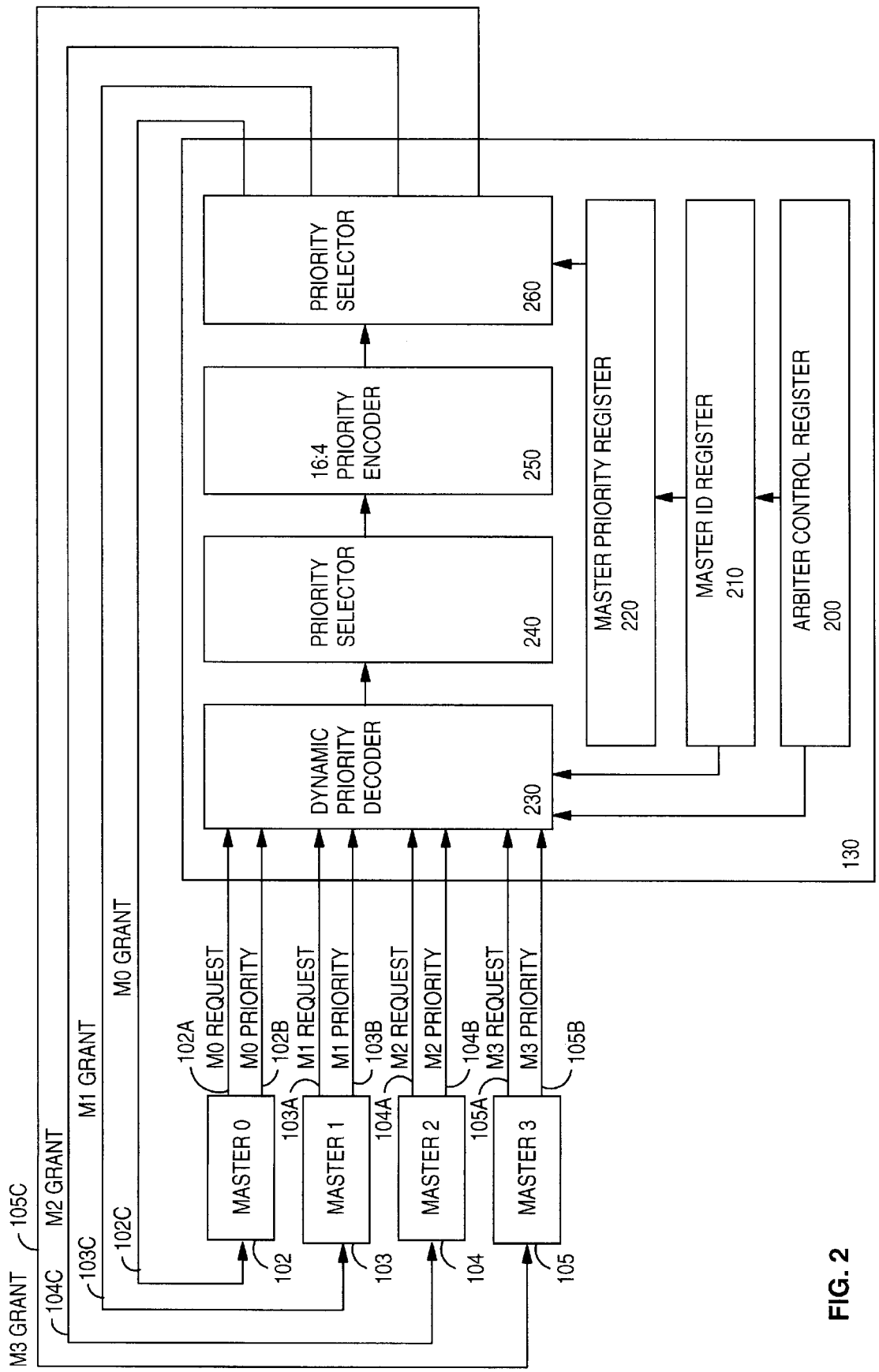
FIG. 2 is a block diagram illustrating the master devices, the bus arbiter and a slave device according to the preset invention.

Referring to FIG. 2, a block diagram illustrating arbiter 130 is shown. In the illustration in FIG. 2, four masters are present, namely, Master 0 102, Master 1 103, Master 2 104 and Master 3 105. The masters submit their requests and request priority to arbiter 130. For example, Master 0 submits its request "M0 REQUEST" and its request priority signal "M0 PRIORITY" at 102a and 102b, respectively, Master 1 submits its request M1 REQUEST and its request priority signal M1 PRIORITY at 103a and 103b, respectively, Master 2 submits its request M2 REQUEST and its priority request signal M2 PRIORITY at 104a and 104b, respectively, and Master 3 submits its request M3 REQUEST and its request priority signal M3 PRIORITY at 105a and 105b, respectively. Grant signals are sent by arbiter 130 back to the masters. In particular, arbiter 130 sends a grant signal, at the appropriate time, to Master 0 at 102c, to Master 1 at 103c, to Master 2 at 104c, and to Master 3 at 105c.

Arbiter 130 also includes arbiter control register 200, master ID register 210 and master priority register 220. In addition, arbiter 130 includes dynamic priority decoder 230, priority selector 240, priority encoder 250 and grant selector 260. The arbiter control register 200 sends a control signal to dynamic priority decoder 230 and provides input to master ID register 210. Master ID register 210 provides input to master priority register 220 and also sends a signal to master priority decoder 230. Finally, master priority register 220 sends a signal to grant selector 260.

The output of the dynamic priority decoder 230 serves as input to priority selector 240. In turn, the output of priority selector 240 serves as input to priority encoder 250. Finally, the output of priority encoder 250 serves as input to grant selector 260. The result of the operations of grant selector 260 provides the grant signal to one of Master 0 102, Master 1 103, Master 2 104 and Master 3 105.

Arbiter Control Register, Master ID Register and Master Priority Register

Figure 3A:
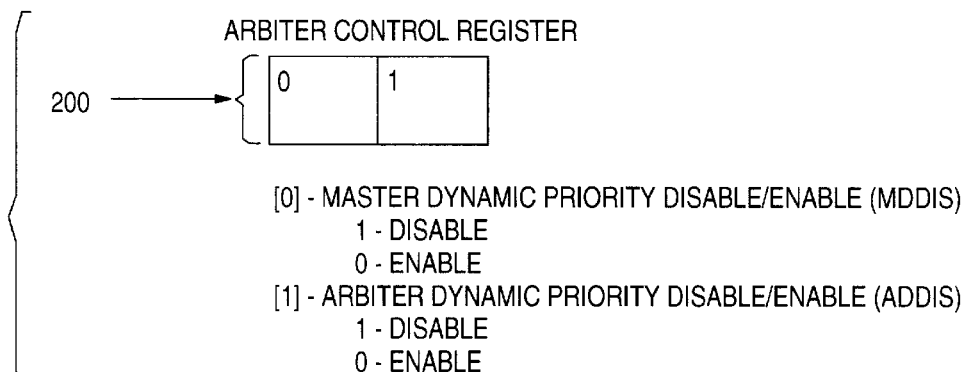
FIGS. 3A–3C illustrate the arbiter control register, the master ID register and the master priority register illustrated in FIG. 2 according to the present invention
Figure 3B:
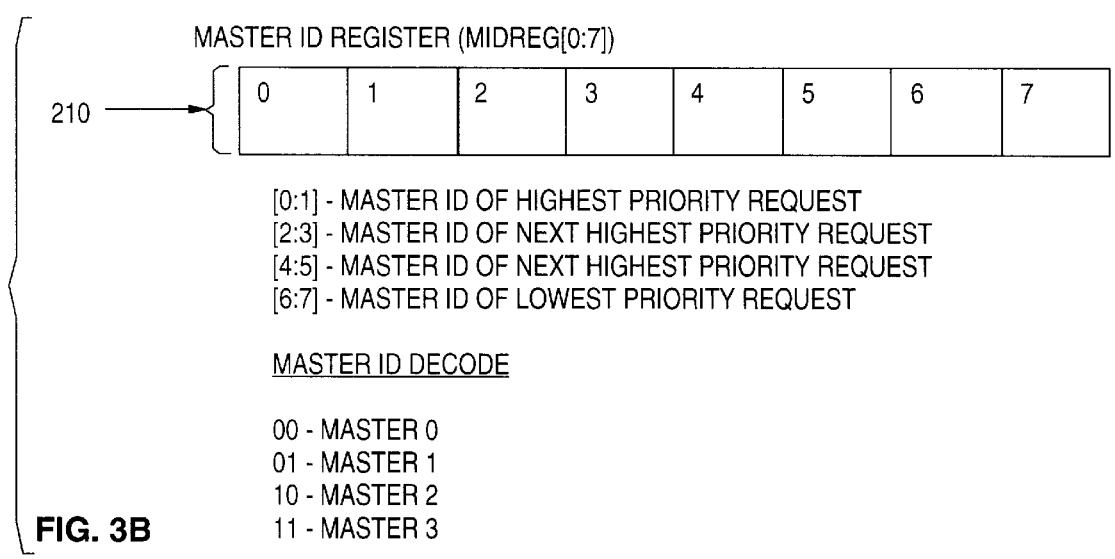
Figure 3C:
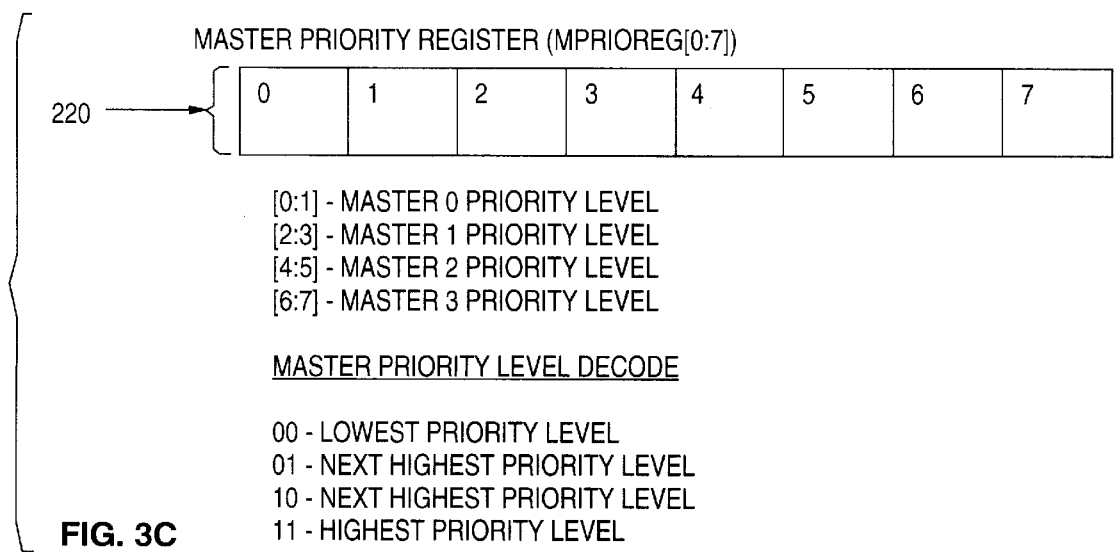

Referring to FIGS. 3A–3C, arbiter control register 200, master ID register 210 and master priority register 220 will now be described. As illustrated in FIG. 3A, arbiter control register 200 is a two bit register. Bit 0 is the master dynamic priority disable/enable ("MDDIS") bit. If this bit has a value of "0," the master dynamic priority is enabled. If the value of Bit 0 is "1," master dynamic priority is disabled. Bit 1 represents the arbiter dynamic priority disable/enable ("ADDIS") bit. If this bit has a value of "0," arbiter dynamic priority is enabled. On the other hand, if Bit 1 has a value of "1," arbiter dynamic priority is disabled.

Referring now to FIG. 3B, the master ID register 210 ("MIDREG") will be described. Master ID register 210 is an eight bit register. This register contains four two bit master ID fields which indicate the level of programmable fixed priority. This register is used to determine the priority order when two or more requests are submitted to the arbiter having the same highest dynamic priority. Bits 0 and 1 identify the master having the highest priority request. Bits 2 and 3 identify the master having the next highest priority request. Bits 4 and 5 represent the master having the third highest priority request. Finally, Bits 6 and 7 identify the master having the lowest priority request. The masters are identified using a two bit code such that Master 0 may be identified by "00," Master 1 may be identified by "01," Master 2 may be identified by "10," and Master 3 is identified by "11."

Referring to FIG. 3C, the master priority register ("IMPRIOREG") 220 will now be described. Master priority register 220 is an eight bit register, the contents of which are generated from master ID register 210. The signals represented by master priority register 220 indicate the fixed programmable priority order for each master. Bits 0 and 1 represent the priority level for Master 0, Bits 2 and 3 represent the priority level for Master 1, Bits 4 and 5 represent the priority level for Master 2, and Bits.6 and 7 represent the priority level for Master 3. In addition, the priority level for each master is represented using a two bit code with "00" representing the master having the lowest priority level, "01" representing the master having the next highest priority level, "10" representing the master having the next (third) highest priority level, and "11" representing the master having the highest priority level.

Dynamic Priority Decoder

Figure 4A:
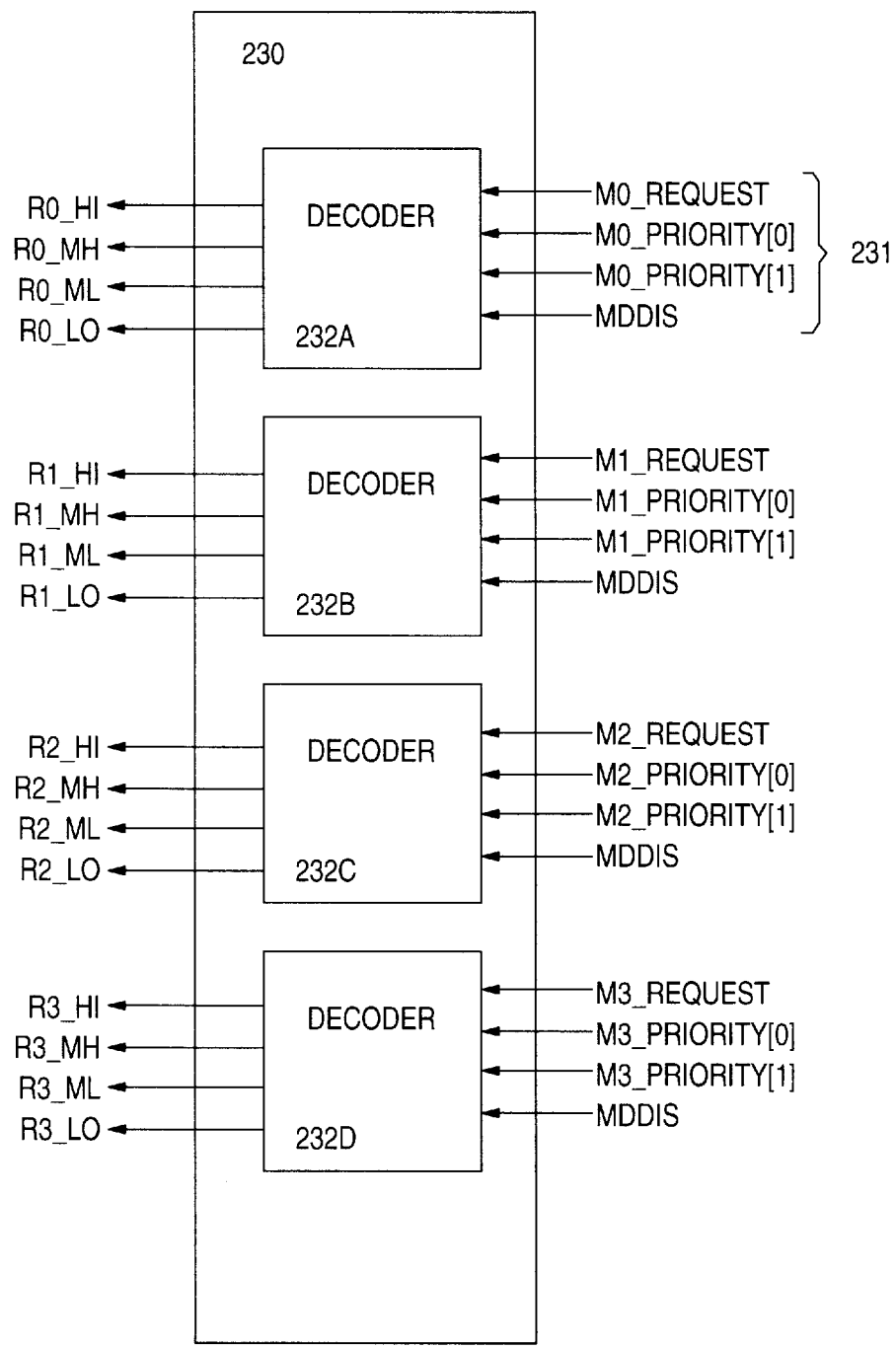
FIGS. 4A–4B are block diagrams illustrating the dynamic priority decoder illustrated in FIG. 2 according to the present invention.
Figure 4B:
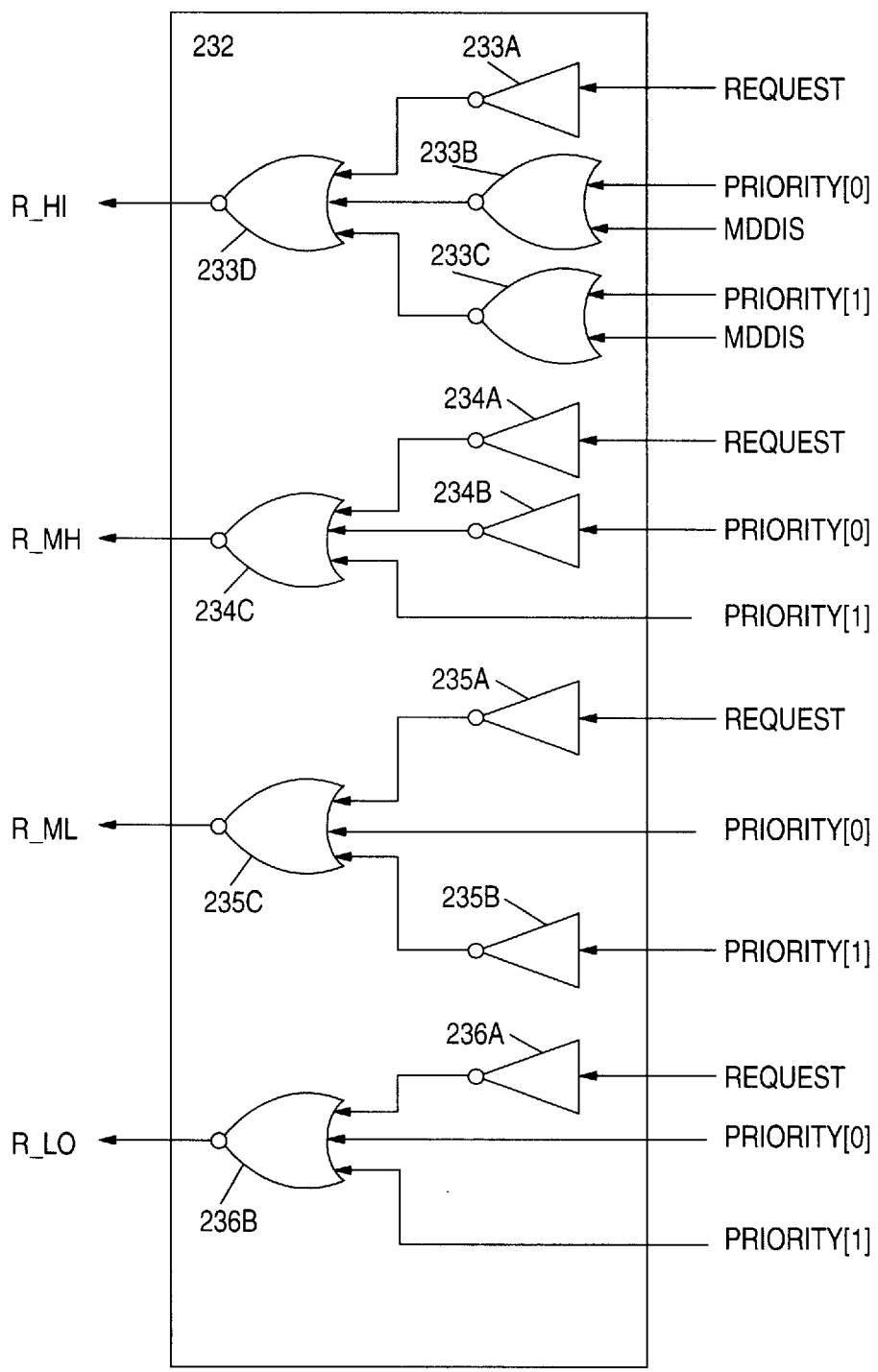

Referring to FIGS. 4A and 4B, a block diagram illustrating the dynamic priority decoder 230 will now be described. The dynamic priority decoder will be enabled or disabled dependent upon the two bit arbiter control register 200. Dynamic priority decoder 230 accepts as input, in addition to the two bits from the arbiter control register 200 for each master, the request signal, and the two bit request priority signal for each master. The request signal and the two bit request priority signal for each master are decoded into four separate request outputs, one for each level of master dynamic priority.

Referring to FIG. 4A, dynamic priority decoder 230 has four decoders 232a, 232b, 232c and 232d. Each decoder 232 has as inputs as indicated generally at 231 the bus request, the corresponding two bit request priority signal, and the MDDIS bit from the arbiter control register 200. Each decoder 232 has four output signals, one indicating whether the result of the decoder processing is "high," one indicating whether the result of the decoder process is "medium high," one indicating whether the output of the decoder 232 is "medium low," and one indicating whether the output of the decoder 232 is "low."

More particularly, by way of example, decoder 232a has as inputs, M0_REQUEST, M0_PRIORITY [0], M0_PRIORITY[1] and MDDIS. In addition, decoder 232a has as output signals R0_HI, R0_MH, R0_ML and R0_LO.

Each decoder 232 in turn contains four blocks of logic. In particular, decoder 232 has a block of logic comprising gates 233a, 233b, 233c and 233d. Inverter 233a accepts as input a REQUEST signal, inverts this signal, and provides it as input to NOR gate 233d. NOR gate 233b accepts Bit 0 of the request priority signal for the master (i.e., PRIORITY [0]) and the master dynamic priority disable/enable bit as input, and passes the result of the NOR operation as input to NOR gate 233d. In addition, NOR gate 233c accepts as input the master dynamic priority disable/enable bit of arbiter control register 200 and the second bit of the request priority signal associated with the corresponding master and the corresponding request (i.e., PRIORITY [1]) and provides the result of the NOR operation as input to NOR gate 233d. The output of the "NOR" gate 233d is a one bit signal "R_HI" which indicates whether the master dynamic priority is "high."

The second logic block comprising gates 234a, 234b and 234c decodes the input to determine whether the master dynamic priority level associated with a master is "medium high." In particular, logic block 234 has inverter 234a, inverter 234b and NOR gate 234c. Inverter 234a accepts as input the request signal from the master (i.e., REQUEST), inverts the signal and provides it as input to NOR gate 234c. Inverter 234b accepts as input Bit 0 of the request priority signal (i.e., PRIORITY [0]) corresponding to the master submitting the request, inverts this signal and provides the inverted signal as input to NOR gate 234c. Finally, the second bit of the request priority signal (i.e., PRIORITY[1]) is submitted directly as input to NOR gate 234c. The output of NOR gate 234c represents a one bit signal which indicates whether the master dynamic plurality has a "medium high" level.

Logic block 235 decodes the input signals to determine whether the master dynamic priority level for the request is "medium low." This is determined by inverter 235a accepting as input the request signal from the master, inverting the request signal and providing the inverted signal as input to NOR gate 235c. In addition, inverter 235b accepts the second request priority signal (i.e., PRIORITY[1]) as input, inverts this signal and provides the inverted signal as input to NOR gate 235c. Finally, the first bit of the request priority signal (i.e., PRIORITY [0]) is submitted directly as input into NOR gate 235c. The output of NOR gate 235c is a one bit signal indicating whether the master dynamic priority for the master is "medium low."

Finally, decoder 232 determines whether the master dynamic priority for the master is "low." Inverter 236a accepts as input the request signal from the master, inverts the signal and provides it as input to NOR gate 236b. In addition, both bits of the request priority signal are submitted directly as inputs to NOR gate 236b. The output of NOR gate 236b is a one bit signal indicating whether the master dynamic priority for the master is "low."

Priority Selector

Figure 5A:
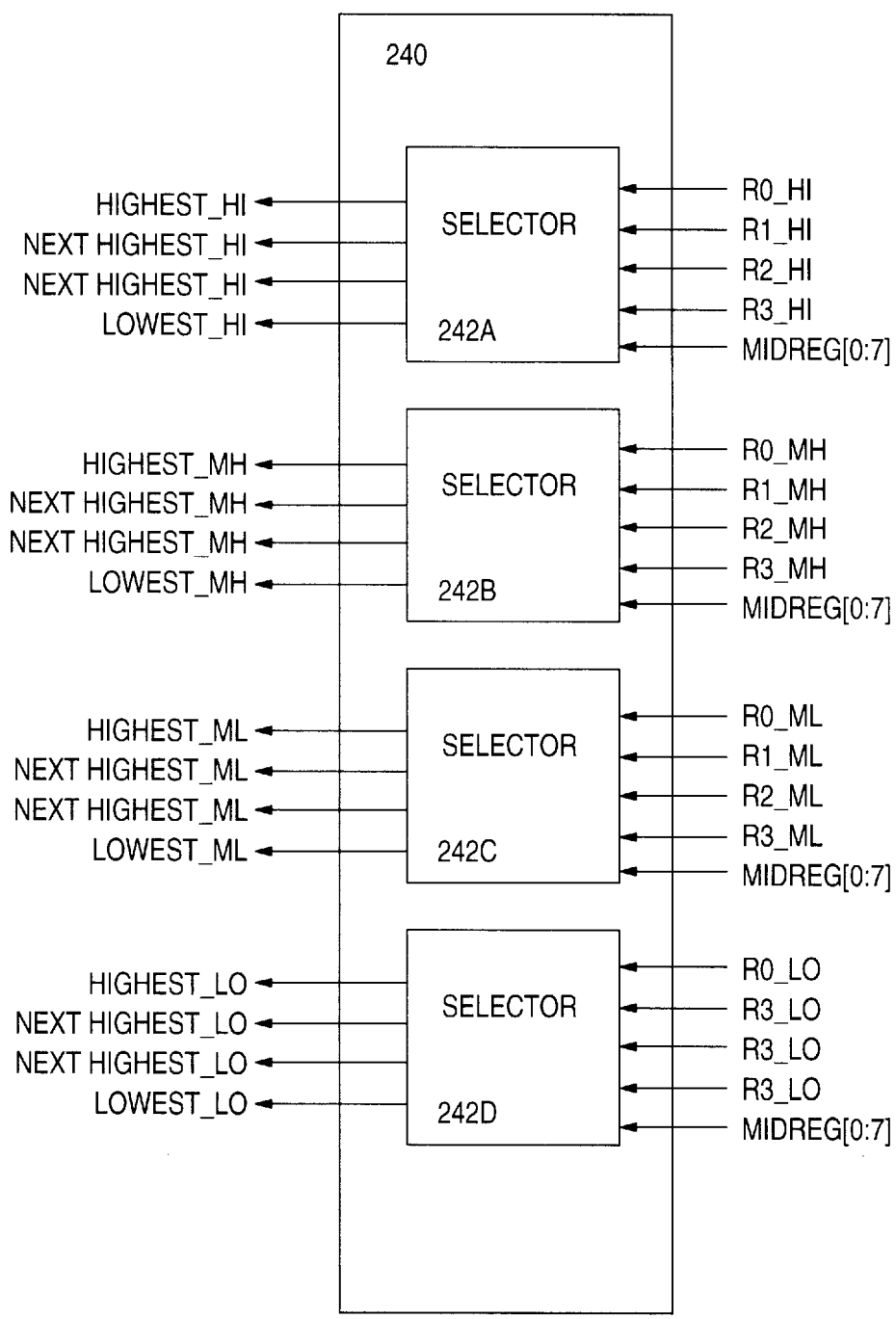
FIGS. 5A–5B are block diagrams illustrating the priority selector illustrated in FIG. 2 according to the present invention.

Now referring to FIGS. 5A–5B, priority selector 240 will now be described. Priority selector 240 reorders the requests based on the programmable fixed priority as defined in the master ID register 210. The same master ID is identified in only one field of master ID register 210. The priority selector uses the eight bit master ID register 210 to select the order that the requests will be sent to the priority encoder 250. Thus, the "high" master dynamic priority signals (one for each master) are reordered according to the order set forth in the master ID register 210. In addition, the "medium high" master dynamic priority signals (one for each master) are reordered according to the order set forth in the master ID register 210. Similarly, the "medium low" master dynamic priority signals (one for each master) are reordered according to the order set forth in the master ID register 210. Finally, the "low" master dynamic priority signals (one for each master) are reordered according to the order set forth in the master ID register 210.

Priority selector 240 has four selector units 242*a*, 242*b*, 242*c* and 242*d*. Each selector 242 accepts as inputs the signals from the decoders 232 corresponding to the appropriate master dynamic priority level. For example, selector 242*a* has as inputs the four master dynamic priority signals of each master indicating as to whether the master has a "high" master dynamic priority level. In addition, each selector has as input the seven bit master ID register. Each selector 242 has four one bit outputs ranking the "high" master dynamic priority signals of the four masters. For example, selector 242*a* has as its four outputs an indication as to which master has the highest "high" master dynamic priority level, the next highest "high" master dynamic priority level, the next (third) highest "high" priority level signal and the lowest "high" master dynamic priority level signal.

Figure 5B:
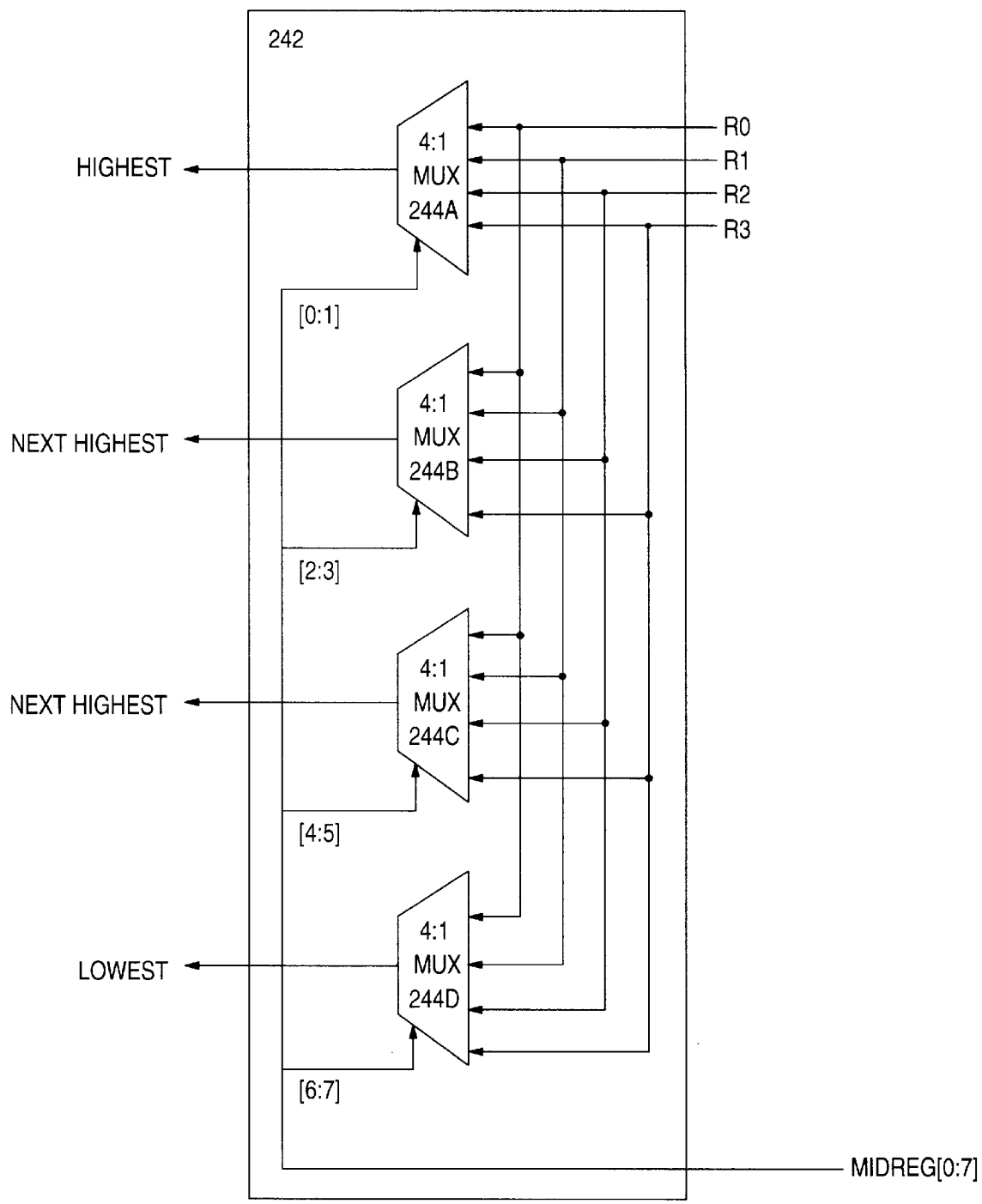

Referring to FIG. 5B, each selector 242 is illustrated. Each selector 242 has four 4:1 multiplexors 244*a*, 244*b*, 244*c* and 244*d*. The four inputs representing the corresponding master dynamic priority level signal (e.g., an indication as to whether the master priority level signal for each master is "high") serves as an input to each multiplexor 244*a*, 244*b*, 244*c* and 244*d*. The master ID register 210 serves as the control for the multiplexors 244. In particular, Bits 0 and 1 of master ID register 210 serves as the control for multiplexor 244*a*, Bits 2 and 3 serve as the control for multiplexor 244*b*, Bits 4 and 5 serve as the control for multiplexor 244*c* and Bits 6 and 7 serve as the control for multiplexor 244*d*.

The outputs of multiplexors 244, and consequently the outputs of selector units 242, serve as inputs to priority encoder 250 which will now be described with respect to FIG. 6.

Priority Encoder

Figure 6A:
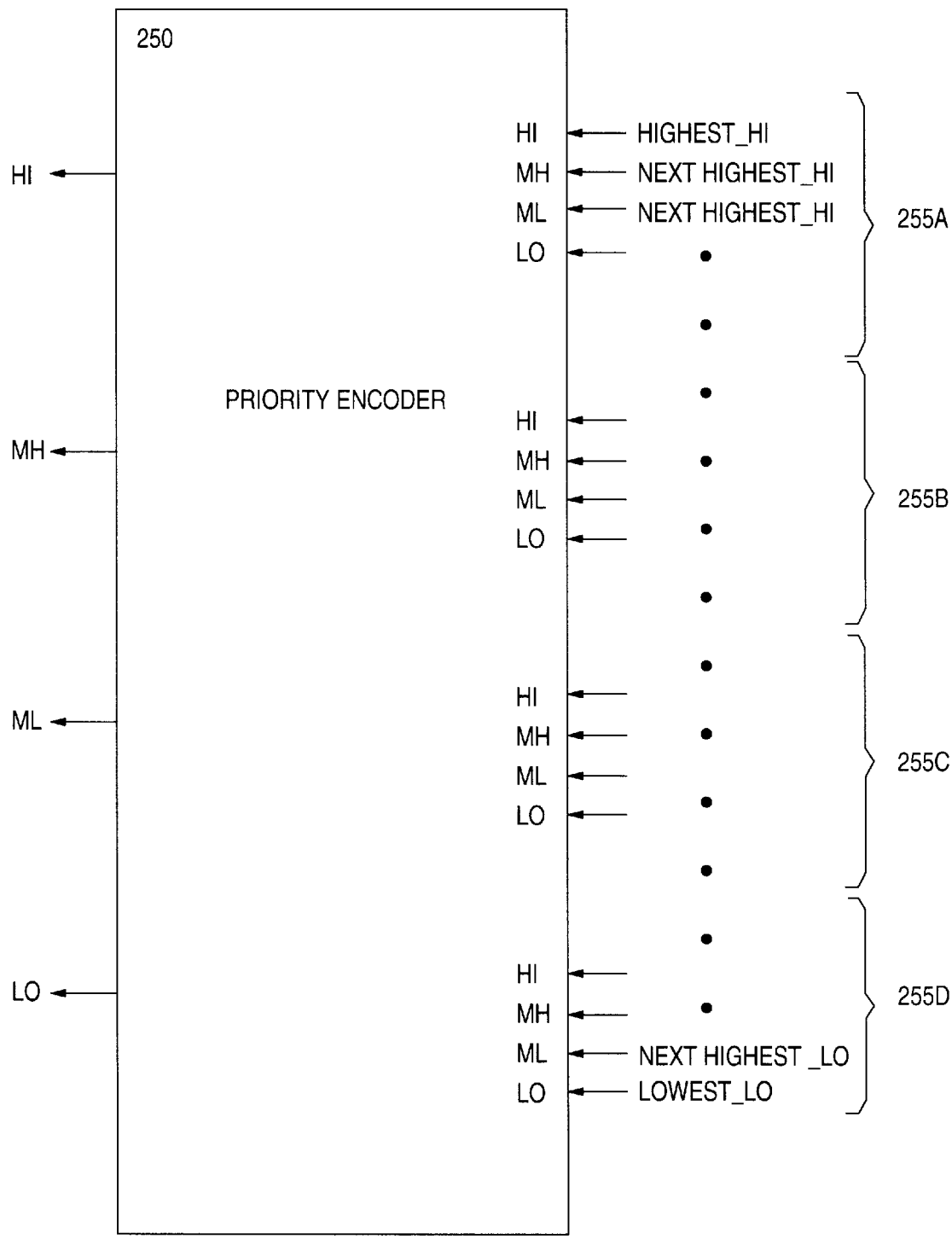
FIG. 6A is a block diagram illustrating the inputs and outputs for the priority encoder illustrated in FIG. 2 according to the present invention.
Figure 6B:
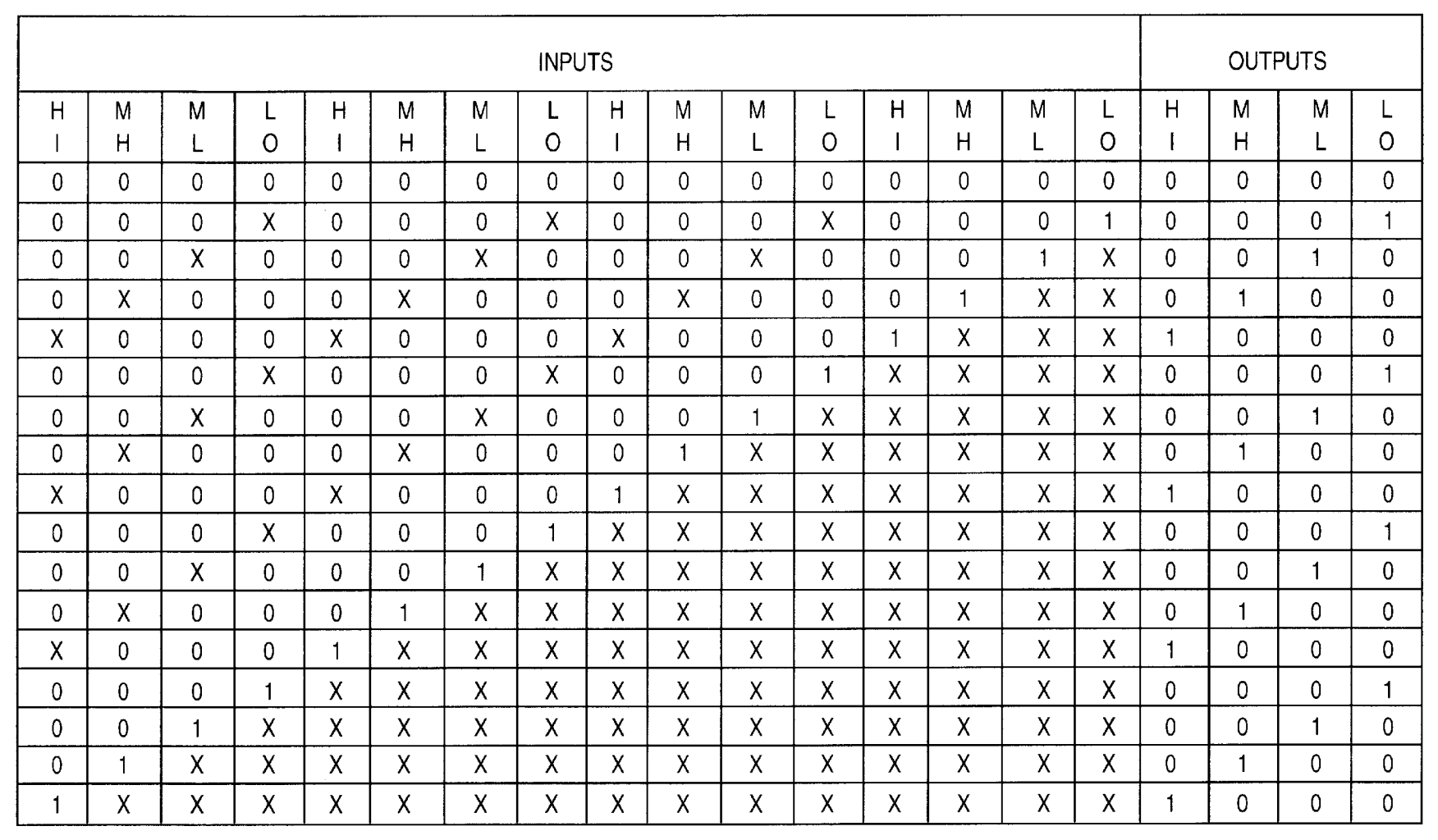

Referring now to FIGS. 6A–6B, priority encoder 250 will now be described. In the preferred embodiment, priority encoder 250 is a 16:4 priority encoder which accepts as inputs the requests having been reordered based on both master dynamic priority and programmable fixed priority, and outputs the grouping of request signals having the highest priority signal which is active. The priority encoder considers the left most input to the priority encoder to be the highest request. The priority of the requests which serve as inputs to priority encoder 250 descend in order from left to right. Priority encoder 250, has four outputs representing the priority master request signals "high," "medium high," "medium low" and "low."

As illustrated in FIG. 6A, the inputs corresponding to the master's signals relating "highest" priority are indicated generally at 255*a* and descend in order from left to right beginning with the highest master having a request priority signal of "high" followed by the next highest master having a request priority signal of "high." The next grouping of four inputs illustrated generally at 255*b* represents the highest to lowest masters ranked according to their master dynamic priority levels signals for "medium high." The grouping of inputs illustrated generally at 255*c* represents the four masters ordered from highest to lowest based on the value of their master dynamic priority signals for the "medium low" signal. Finally, the input grouping referred to generally at 255*d* represents the four masters in descending order corresponding to their master dynamic priority level signals for the master dynamic priority level of "low." The grant output is dependent on the value of the master dynamic priority having the highest priority request.

Referring now to FIG. 6B, a logic diagram illustrating the logic implemented by priority encoder 250 is illustrated. In the logic diagram, the inputs to priority encoder 250 are prioritized in descending priority (master dynamic priority and programmable fixed priority) order from left to right. Each input is categorized as having one of four priority levels, namely, "high", "medium high", "medium low", and "low". Therefore, four distinct groups of input signals are created. An output signal is assigned to each of the four groups of input signals to accomplish a 16:4 reduction. In the logic diagram illustrated in FIG. 6B, the "x" indicates that the value of the input signal has no impact on the output.

Grant Selector

Figure 7:
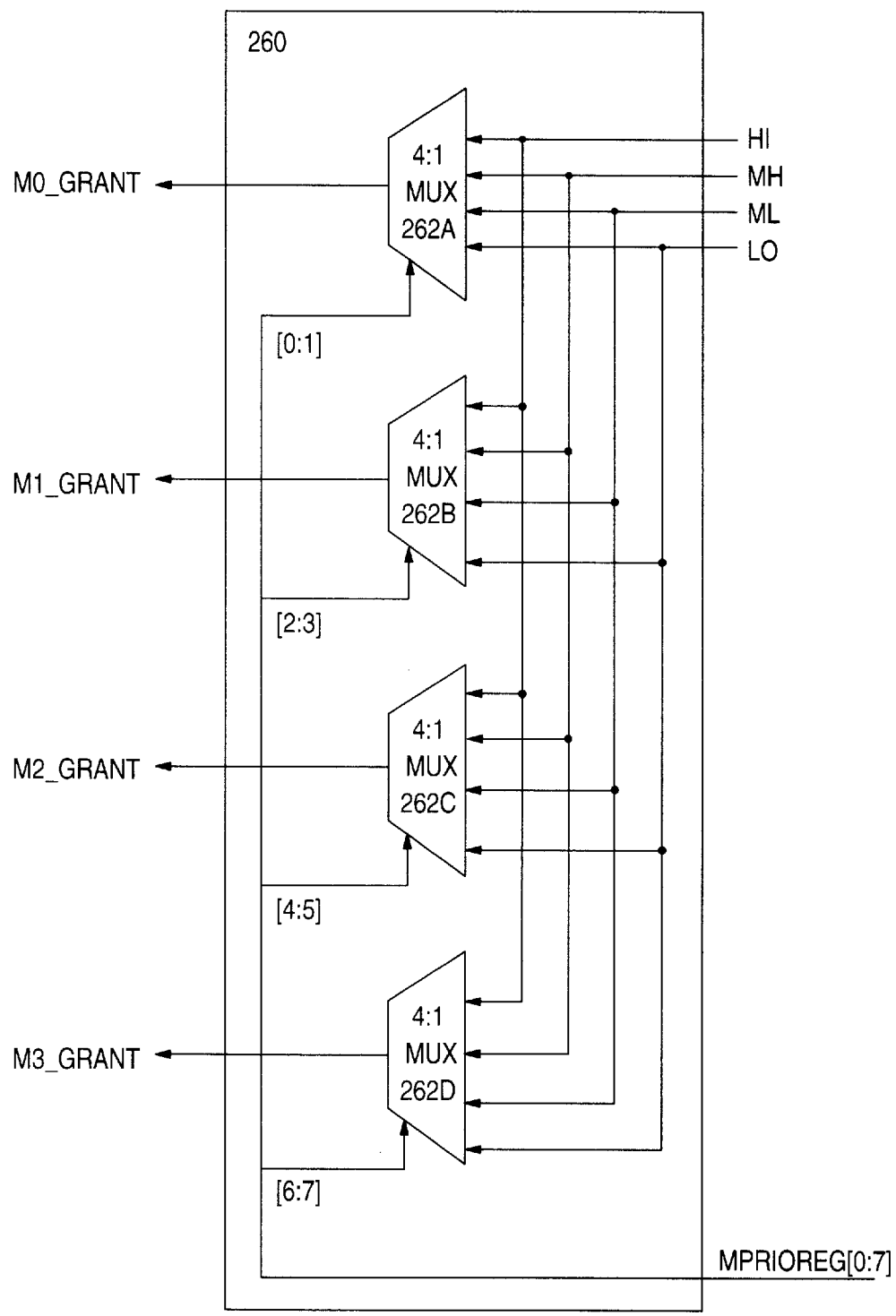
FIG. 7 is a block diagram illustrating the grant selector illustrated in FIG. 2 according to the present invention.

Referring now to FIG. 7, the grant selector 260 will now be described. Grant selector 260 determines which master had the priority level which is the subject of the output from priority encoder 250, and sends a grant signal to the corresponding master. Grant selector 260 is similar to selector 242 with the exception being that there is only one grant selector 260 whereas there were four selectors 242. Grant selector 260 comprises four 4:1 multiplexors 262*a*, 262*b*, 262*c* and 262*d*. The selector control to multiplexors 262 is provided by the eight bit master priority register in which Bits 0 and 1 provide the input selection to multiplexor 262*a*, Bits 2 and 3 provide the input selection to multiplexor 262*b*, Bits 4 and 5 provide the input selection to multiplexor 262*c*, and Bits 6 and 7 provide the input selection to multiplexor 262*d*. The output of the priority encoder 250 provides the highest dynamic priority request and also indicates the programmed priority level for that highest priority request.

Thus, grant selector 260 identifies the master which submitted the request having the highest dynamic priority and activates the corresponding master grant signal. The master priority field is then used to select the appropriate priority output from the priority encoder 250 for the master grant signals.

Arbiter Dynamic Arbitration

In the preferred embodiment, the arbitration unit according to the present invention provides both fixed programmable priority and master dynamic priority as described above. Arbiter dynamic priority is implemented by updating the master ID register 210 with a new programmed priority order each time the bus is granted to a new master. Generally, this type of arbitration is used to provide for a fair arbitration scheme when several masters all having equal master dynamic priority levels need to equally share the bandwidth of the bus.

One example of a fair arbitration scheme is Least Recently Used ("LRU"). Under this arbitration scheme, the master ID register is updated to place the master that was most recently granted the bus as having the lowest priority. All other masters then move up one level of priority. This procedure continues each time the bus is granted and allows for bus access to be shared equally among all masters under the arbiter dynamic priority according to the present invention.

Figure 8:
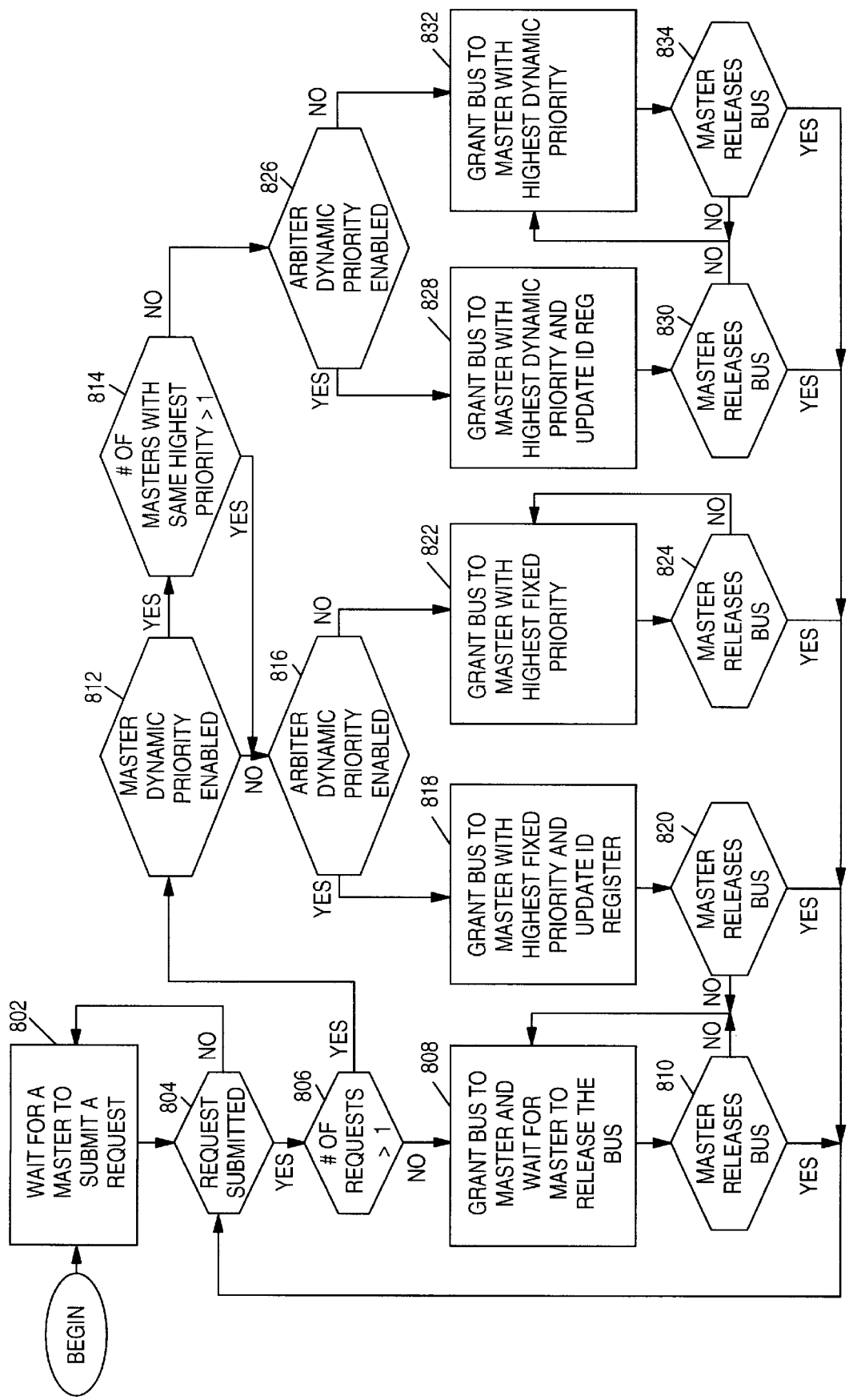
FIG. 8 is a flow chart representation illustrating the operation of the flexible arbitration system according to the present invention.

FIG. 8 is a flow chart and FIG. 9 is a timing diagram illustrating the methods, systems, and program products according to the present invention. It will be understood that each block or step of the timing diagram and flow chart, and combinations of the blocks or steps in the diagram and flow chart, can be implemented by computer program instructions. These computer program instructions may be loaded onto a computer or other programmable data processing apparatus to produce a machine such that the instructions which execute on the computer or other programmable apparatus create means for implementing the functions specified in the timing diagram or flow chart block(s) or step(s). These computer program instructions may also be stored in a computer readable memory that can direct a computer or other programmable apparatus to function in a particular manner, such that the instructions stored in the computer readable memory produce an article of manufacture including instruction means which implement the functions specified in the timing diagram or flow chart block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the timing diagram or flow chart block(s) or step(s).

Accordingly blocks or steps of the timing diagram or flow chart illustrations support combinations of means for performing the specified functions, combinations of steps for performing the specified functions and program instruction means for performing the specified function. It will also be understood that each block or step of the timing diagram or flow chart illustrations, and combinations of blocks or steps in the timing diagram or flow chart illustrations, can be implemented by special purpose hardware based computer systems which perform the specified functions or steps, or combinations of special purpose hardware and computer instructions.

Referring to FIG. 8, a flow chart representation illustrating the operation of the dynamic and programmable arbitration system according to the present invention will now be described. The process begins at 802 where the system waits for a master to submit a request. A determination is made at 804 as to whether a request has been submitted. If no request has been submitted, control is returned to 802 to wait for a request to access the bus to be submitted by a master.

If it is determined at 804 that a master submitted a request to access the bus, a determination is then made at 806 as to whether more than one request was submitted.

If it was determined at 806 that more than one request to access the bus was submitted, a determination is made at 812 as to whether the master dynamic priority was enabled. If the master dynamic priority was enabled, it is determined at 814 as to whether the number of masters having the same highest priority is greater than one. If the number of masters having the same highest priority is greater than one, processing continues at 816. If it was determined at 812 that master dynamic priority was not enabled, control is transferred to 816. A determination is made at 816 as to whether arbiter dynamic priority was enabled. If it was determined at 816 that arbiter dynamic priority was enabled, bus access is granted at 818 to the master having the highest fixed priority and the master ID register is updated. Thereafter, a determination is made at 820 as to whether the master released the bus. If the master has not released the bus, a grant signal continues to be sent to the master and the master continues to access the bus at 808 and processing waits until the master releases the bus.

If it is determined at 820 that the master released the bus, control is returned to 804 to determine whether an additional request has been submitted.

Similarly, at 820, a determination is made as to whether the master released the bus. If the master has not released the bus, processing continues at 808 by continuing to allow the master to access the bus and waiting for the master to release the bus. If it is determined at 810 that the mater released the bus, control is returned to 804 to determine whether an additional request to access the bus has been submitted.

If it was determined at 816 that arbiter dynamic priority was not enabled, bus access is granted at 822 to the master having the highest programmable fixed priority. Once bus access has been granted to this master, a determination is made at 824 as to whether this master has released the bus. If the master has not released the bus, processing continues at 822 permitting the master to continue accessing the bus and the determination process also continues at 824 until such time as the master releases the bus. If it is determined at 824 that the master has released the bus, control returns to 804 to determine whether an additional request to access the bus was submitted.

If it was determined at 814 that the number of masters having the same highest priority was not greater than one, a determination is made at 826 as to whether the arbiter dynamic priority was enabled. If arbiter dynamic priority was enabled, access to the bus is granted at 828 to the master having the highest master dynamic priority and the master ID register is updated. Thereafter, a determination is made at 830 as to whether the master has released the bus. If the master has released the bus, control is returned to 804 in order to determine whether an additional request to access the bus was submitted. If it is determined at 830 that the master has not released the bus, control is transferred to 832.

If it is determined at 826 that arbiter dynamic priority was not enabled, bus access is then granted to the master with the highest dynamic priority and this master continues to access the bus until it is determined at 834 that the master has released the bus. If it is determined that the master has released the bus at 834, control is returned to 804 to determine whether an additional request to access the bus was submitted.

Referring to FIG. 9, a timing diagram illustrating an example of the operation of the present invention is shown. In the particular example illustrated in FIG. 9, arbiter 130 receives a bus request from Master 0 (M0) and Master 1 (M1) during Cycle 1. The M0 Request has an associated request priority signal of "10." The M1 Request has an associated request priority signal of "11." During Cycle 1 the arbiter control register has a value of "11." In addition, master ID register has a value of "00011011" with Bits 0, 1 being "00," Bits 2, 3 being "01," Bits 4, 5 being "10," and Bits 6, 7 being "11." Finally, the master priority register has a value of "11100100" during Cycle 1 such that Bits 0, 1 are "11," Bits 2, 3 are "10," Bits 4, 5 are "01," and Bits 5, 6 are "00." During Cycle 1, the present invention determines that Master 0 should have access to the bus. In response, access to the bus is granted to Master 0 during clock Cycle 2. Master 0 maintains access to the bus until Cycle 4.

During Cycle 4, Master 2 and Master 3 both submit requests to access the bus. The request priority associated with Master 2's request is "10" while the request priority associated with Master 3's request is "00." According to the present invention, Master 0 maintains control of the bus through Cycle 4 and relinquishes control at some point during Cycle 4.

Thereafter, during Cycle 5, the present invention determines that Master 1 should have access to the bus. As a result, Master 1 is granted access to the bus during Cycle 6. In addition, the master ID register is reordered to have a value of "01101100" such that Bits 0, 1 are "01," Bits 2, 3 are "10," Bits 4, 5 are "11," and Bits 6, 7 are "00." In addition, the master priority register is updated to have a value of "00111001" such that Bits 0, 1 are "00, Bits 2, 3 are "11," Bits 4, 5 are "10," and Bits 6, 7 are "01."

Thereafter, Master 1 maintains control of the bus during Cycle 7. During Cycle 7, the present invention determines that Master 1 should maintain control of the bus. In addition, the arbiter control register is set to "00" indicating that both the master dynamic priority and arbiter dynamic priority are enabled.

Master 1 continues to access and control the bus through Cycle 8. During Cycle 8, the master ID register is updated to have a value of "01101100." As such, Bits 0, 1 are set to "01," Bits 2, 3 are set to "10," Bits 4, 5 are set to "11," and Bits 6, 7 are set to "00." In addition, the master priority register is also updated to have a value of "00111001" such that Bits 0, 1 are "00," Bits 2, 3 are "11," Bits 4, 5 are "10," and Bits 6, 7 are "01." Master 1 relinquishes control during Cycle 8.

Thereafter, during Cycle 9 the present invention determines that the bus is available and based on the master dynamic priority being enabled as represented by the arbiter control register being set to "00," control is granted to Master 2 during Cycle 10. In addition, the master ID register is updated using the fair arbitration scheme such that the master ID register now has a value of "10110001" with Bits 0, 1 being "10," Bits 2, 3 being "11," Bits 4, 5 being "00," and Bits 6, 7 being "01." In addition, the master priority register is also updated to have a value of "01001110" such that Bits 0, 1 are "01," Bits 2, 3 are "00," Bits 4, 5 are "11," and Bits 6, 7 are "10."

Master 2 relinquishes control during Cycle 10. As a result, a determination is made during Cycle 11 as to which master should gain access to the bus. Bus access is granted during Cycle 12 to Master 3. In addition, the master ID register is updated to have a value of "11000110" and the master priority register is updated to have a value of "10010011."

While the present invention has been described with respect to the transfer of application data on a bus, it will be understood that the present invention is not restricted to the transfer of any specific type of data or signals, but may apply also to the transfer of any other type of data such as instruction data, address data, data bus and transfer qualifiers, burst signals, bus lock signals, and so forth. Also, while the present invention has been described with respect to license with predefined slave and master status, as will be appreciated by those with skill in the art, any particular device may be a slow device for one operation and a master device for a different operation.

Furthermore, the present invention has been described with respect to positive logic such that a positive voltage corresponds to a logic state of "1." As will be appreciate by those of skill in the art, the present invention may also be implemented utilizing any suitable means of signifying an active and inactive state.

In the drawings and specification, there have been disclosed typical preferred embodiments of the invention and, although specific terms are employed, they are used in a generic and descriptive sense only and are not for purposes of limitation, the scope of the invention being set forth in the following claims.

That which is claimed is:

1. A method for controlling access to a bus having a plurality of devices operationally connectable thereto, said method comprising the steps of:

receiving a request to control the bus from a first of said devices;

determining a programmable fixed priority level associated with the request from the first device; and controlling access to the bus by the first device based on the combination of the programmable fixed priority level associated with the first device and a dynamic priority level associated with the first device, wherein access to the bus is granted to the first device based on the combination of the programmable fixed priority level associated with the first device and the dynamic priority level associated with the first device.

2. The method according to claim 1 wherein said controlling step comprises the steps of:

arbitrating the request from the first device based on the programmable fixed priority level associated with the first device;

arbitrating the request from the first device based on the dynamic priority level associated with the first device; and granting access to the bus by the first device based on the combination of the programmable fixed priority level associated with the first device and the dynamic priority level associated with the first device.

3. The method according to claim 2 wherein said dynamic priority level associated with the first device comprises an arbiter dynamic priority level associated with the first device and a master dynamic priority level associated with the first device; and wherein said dynamic priority level arbitrating step comprises the steps of:

receiving the master dynamic priority level associated with the first device from the first device;

arbitrating the request from the first device based on the arbiter dynamic priority level associated with the first device; and arbitrating the request from the first device based on the master dynamic priority level receiving from the first device.

4. The method according to claim 3 wherein said controlling access step is preceded by the step of granting access to the bus by a second of said devices; and wherein said arbiter dynamic priority level arbitrating step comprises the steps of:

modifying the arbiter dynamic priority level associated with the first device in response to the granting access to the bus by the second device; and arbitrating the request from the first device based on the modified dynamic priority level associated with the first device.

5. The method according to claim 4 wherein the modifying arbiter dynamic priority level step modifies the arbiter dynamic priority level based on a "fair" scheme.

6. The method according to claim 3 wherein access to the bus is granted to the first device in response to the master dynamic priority level arbitrating step notwithstanding the arbiter dynamic priority level arbitrating step.

7. The method according to claim 1 wherein said programmable fixed priority associated with the first device is modified.

8. The method according to claim 1 further comprising the step of transferring data between the first device and the bus in response to the controlling step.

9. The method according to claim 8 wherein said data comprises at least one of applications data, computer program instructions, and address data.

10. The method according to claim 1 wherein access to the bus is controlled without restriction on the applications being run on the devices.

11. The method according to claim 1 wherein said controlling step is preceded by the steps of:
receiving a request to control the bus from a second of said devices, said second device having a dynamic priority level associated therewith; and
determining a programmable fixed priority level associated with the request from the second device.

12. A system for controlling access to a bus having a plurality of devices operationally connectable thereto, said system comprising:
means for receiving a request to control the bus from a first of said devices;
means for determining a programmable fixed priority level associated with the request from the first device; and
means, responsive to said receiving means and said determining means, for controlling access to the bus by the first device based on the combination of the programmable fixed priority level associated with the first device and a dynamic priority level associated with the first device, wherein access to the bus is granted to the first device based on the combination of the programmable fixed priority level associated with the first device and the dynamic priority level associated with the first device.

13. A system according to claim 12, wherein said means for controlling comprises:
means for arbitrating the request from the first device based on the programmable fixed priority level associated with the first device;
means for arbitrating the request from the first device based on the dynamic priority level associated with the first device; and
means for granting access to the bus by the first device based on the combination of the programmable fixed priority level associated with the first device and the dynamic priority level associated with the first device.

14. The system according to claim 13, wherein said dynamic priority level associated with the first device comprises an arbiter dynamic priority level associated with the first device and a master dynamic priority level associated with the first device; and
wherein said means for arbitrating the request from the first device based on the dynamic priority level comprises:
means for receiving the master dynamic priority level associated with the first device from the first device;
means for arbitrating the request from the first device based on the arbiter dynamic priority level associated with the first device; and
means for arbitrating the request from the first device based on the master dynamic priority level received from the first device.

15. The system according to claim 14, wherein said means for controlling access further comprises means for granting access to the bus by a second of said devices; and
wherein said means for arbitrating the request from the first device based on the arbiter dynamic priority level associated with the first device comprises:
means for modifying the arbiter dynamic priority level associated with the first device in response to the granting access to the bus by the second device; and
means for arbitrating the request from the first device based on the modified dynamic priority level associated with the first device.

16. A system according to claim 15, wherein the means for modifying the arbiter dynamic priority level further comprises means for modifying the dynamic priority level based on a "fair" scheme.

17. A computer program product for controlling access to a bus having a plurality of devices operationally connectable thereto, said computer program product comprising:
a computer readable storage medium having computer readable code means embodied in said medium, said computer readable code means comprising:
computer instruction means for receiving a request to control the bus from a first of said devices;
computer instruction means for determining a programmable fixed priority level associated with the request from the first device; and
computer instruction means, responsive to said computer instruction means for receiving and said computer instruction means for determining, for controlling access to the bus by the first device based on the combination of the programmable fixed priority level associated with the first device and a dynamic priority level associated with the first device, wherein access to the bus is granted to the first device based on the combination of the programmable fixed priority level associated with the first device and the dynamic priority level associated with the first device.

18. A computer program product according to claim 17, wherein said computer instruction means for controlling comprises:
computer instruction means for arbitrating the request from the first device based on the programmable fixed priority level associated with the first device;
computer instruction means for arbitrating the request from the first device based on the dynamic priority level associated with the first device; and
computer instruction means for granting access to the bus by the first device based on the combination of the programmable fixed priority level associated with the first device and the dynamic priority level associated with the first device.

19. The computer program product according to claim 18, wherein said dynamic priority level associated with the first device comprises an arbiter dynamic priority level associated with the first device and a master dynamic priority level associated with the first device; and
wherein said computer instruction means for arbitrating the request from the first device based on the dynamic priority level comprises:
computer instruction means for receiving the master dynamic priority level associated with the first device from the first device;
computer instruction means for arbitrating the request from the first device based on the arbiter dynamic priority level associated with the first device; and
computer instruction means for arbitrating the request from the first device based on the master dynamic priority level received from the first device.

20. The computer program product according to claim 19, wherein said computer instruction means for controlling access further comprises computer instruction means for granting access to the bus by a second of said devices; and wherein said computer instruction means for arbitrating the request from the first device based on the arbiter dynamic priority level associated with the first device comprises:

computer instruction means for modifying the arbiter dynamic priority level associated with the first device in response to the granting access to the bus by the second device; and computer instruction means for arbitrating the request from the first device based on the modified dynamic priority level associated with the first device.

21. A computer program product according to claim 20, wherein the computer instruction means for modifying the arbiter dynamic priority level further comprises computer instruction means for modifying the dynamic priority level based on a "fair" scheme.

\* \* \* \* \*